(12) United States Patent
Chien et al.

(10) Patent No.: US 9,086,596 B2
(45) Date of Patent: Jul. 21, 2015

(54) SURFACE-STABILIZED IPS LCD

(71) Applicants: Liang-Chy Chien, Hudson, OH (US); Jeoung-Yeon Hwang, Kent, OH (US)

(72) Inventors: Liang-Chy Chien, Hudson, OH (US); Jeoung-Yeon Hwang, Kent, OH (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 13/928,773

(22) Filed: Jun. 27, 2013

(65) Prior Publication Data

US 2014/0002781 A1 Jan. 2, 2014

Related U.S. Application Data

(60) Provisional application No. 61/664,808, filed on Jun. 27, 2012.

(51) Int. Cl.
*G02F 1/1337* (2006.01)
*G02F 1/1343* (2006.01)

(52) U.S. Cl.
CPC .... *G02F 1/133703* (2013.01); *G02F 1/133788* (2013.01); *G02F 1/134363* (2013.01); *G02F 2202/022* (2013.01); *G02F 2202/36* (2013.01)

(58) Field of Classification Search
CPC ........ B82Y 30/00; B82Y 40/00; B82Y 15/00; H01G 11/36; C08L 79/02; B01D 2239/025; G02F 1/133703; G02F 1/13; G02F 1/1333; G02F 1/133711; G02F 1/134363; G02F 2001/133776; G02F 2202/36; G02F 2202/022

USPC ................. 977/742, 762, 773, 778, 700, 775; 423/447.1; 349/123, 187, 84, 191, 183, 349/93, 141, 86, 88; 442/340, 339
See application file for complete search history.

(56) References Cited

U.S. PATENT DOCUMENTS

| | | | |
|---|---|---|---|
| 6,177,972 B1 * | 1/2001 | Held et al. | 349/88 |
| 7,586,561 B2 | 9/2009 | Hanaoka | |
| 8,432,521 B2 * | 4/2013 | Jang | 349/141 |
| 2006/0159916 A1 * | 7/2006 | Dubrow et al. | 428/357 |
| 2010/0123859 A1 | 5/2010 | Son et al. | |

FOREIGN PATENT DOCUMENTS

WO 02/48282 A1 6/2002

* cited by examiner

*Primary Examiner* — Thoi Duong
(74) *Attorney, Agent, or Firm* — Renner Kenner Greive Bobak Taylor & Weber

(57) ABSTRACT

A surface-stabilized in-plane switching (SS-IPS) liquid crystal (LCD) cell includes a pair of spaced substrates that include alignment layers disposed thereon. The alignment layers are treated to define a first director orientation. Disposed between the alignment layers is a liquid crystal material that contains polymer fibrils that are disposed upon each of the alignment layers. The polymer fibrils serve to maintain the alignment of the liquid crystal molecules in the first director orientation when no voltage is applied to the LCD cell via interdigitated electrodes disposed upon the alignment layers, thus improving the dynamic response of the SS-IPS LCD cell.

11 Claims, 11 Drawing Sheets

SS-IPS LC Cell with 3% Polymer
SPS-IPS (5/5/3.45μm)

SS-IPS LC Cell with 0.2% Polymer
SPS-IPS (5/5/3.45μm)

Glass Substrate (upper)

FIG-4A

IPS Substrate (lower)

SURFACE-STABILIZED IPS LCD

CROSS-REFERENCE TO RELATED APPLICATION

This application claims the benefit of U.S. Provisional Application No. 61/664,808 filed on Jun. 27, 2012, the contents of which are incorporated herein by reference.

TECHNICAL FIELD

The present invention relates to liquid crystal display (LCD) devices. In particular, the present invention relates to an in-plane switching (IPS) LCD. More particularly, the present invention relates to surface-stabilized IPS LCDs that utilize low-density surface-localized polymer islands to improve its dynamic response.

BACKGROUND OF THE INVENTION

In-plane switching (IPS) is a leading liquid crystal display (LCD) technology, which has as one of its main features the ability to align liquid crystals horizontally to increase their viewing angle while allowing the transmittance of the LCD to be changed. Due to this, IPS technology was unanimously adopted at its introduction by the LCD industry and was one of the first refinements to LCDs, to be incorporated. As a result, wide viewing angles and fast response characteristics were able to be achieved, thus overcoming the two main drawbacks of standard twisted nematic (TN) based LCDs.

After its introduction in 1996, IPS LCD technology evolved through several generations, beginning with IPS and advancing on to Super IPS, Advanced Super IPS (AS-IPS), and finally to IPS-Pro. In particular, Super IPS LCD technology was introduced to overcome color shift problems of the original IPS displays that were apparent at wide viewing angles. AS-IPS allowed opaque electrodes to be replaced with transparent electrodes, which considerably reduced the amount of power that is required for the backlight of an AS-IPS LCD to operate. In addition, AS-IPS also provided smoother pixels, which yielded a cleaner, crisper, and more continuous image at all viewing angles. Finally, because IPS-Pro based LCDs are highly complex, they are expensive to produce, and as such, they are used only in applications where image clarity and precision is considered critical, such as in the medical field, including surgical applications, as well as in advanced engineering and science applications.

In an IPS liquid crystal (LC) cell, the molecules of the LC are aligned horizontally with an angle of about 6~12 degrees with respect to the direction of the LCD electrodes. As such, the LC molecules are kept parallel to the electrode pair and the glass substrate of the LCD screen. Thus, when the IPS LC cell is placed between a pair of polarizers that are crossed at 90 degrees with respect to each other, such that one of the polarizers is aligned with the average LC molecule orientation in the absence of an electric field, the IPS LC cell appears as a black image. In this state, the polarized light passes through the cell without interruption from the LC molecules and is blocked by the front polarizer. To produce an image, a voltage is applied across the electrodes of the IPS cell to form an electric field, referred to as a lateral electric field, which is applied between each end of the liquid crystal molecules. The application of the lateral electric field causes the nematic LC molecules to be reoriented or aligned at an angle between the electrodes, normally at a 45-degree angle between the pair of crossed polarizers. Because the liquid crystal molecules are weakly anchored to the lower glass substrate of the IPS LC cell, they move more freely into the desired alignment upon application of the electric field. In addition, because there is no twisted structure in an IPS LC cell, as in a twisted nematic (TN) cell, the applied electric field causes the LC molecules of the IPS LC cell to be simply switched between dark and bright states in the plane with a fast response or switching speed. Moreover, IPS considerably improves viewing angles of TFT (thin film transistor) based LCDs as compared to TN (twisted nematic) LCDs due to the characteristic symmetrical optical retardation of TNs that occurs at all viewing angles.

IPS technology produces LCDs with high optical contrast between bright and dark images, while allowing wide viewing angles because the blockage of light transmission is complete at the field-off state, allowing the viewer to see black from all viewing angles. The optical transmittance of the aligned nematic LC layer between the polarizers crossed at 90 degrees with respect to each other can be given as $T=\sin^2(2\phi(V))\sin^2(\pi d \Delta n(V)/\lambda)$. As such, $\phi(V)$ is the voltage-dependent azimuthal component of the angle between the LC optic axis and the transmission axes of the crossed polarizers, $\pi d \Delta n(V)$ is voltage-dependent retardation of the LC layer (where d is the thickness of LC layer, $\Delta n$ is the birefringence value of LC layer), and $\lambda$ is the wavelength of incident light. With an applied voltage, the homogeneously-aligned LC molecules are switched in a direction parallel to substrates, making conditions of $\phi(V)=\pi/4$ and $\pi d \Delta n(V)/\lambda=\pi/2$ to maximize the light transmittance, that is, $T=1$. The switching times of turn-on (rise, $\tau_{on}$) and turn-off (decay, $\tau_{off}$) can be described by the following equations: $\tau_{on}=(\gamma_1 d^2/\pi K_{eff})(1/[(V/V_{th})^2-1])$ and $\tau_{off}=(\gamma_1 d^2/\pi K_{eff})$, where $\gamma_1$ is the rotational viscosity of LC molecule, $K_{eff}$ is the effective elastic constant (for IPS, the $K_{eff}$ is equal to $K_{22}$), and V and $V_{th}$ are the applied voltage and threshold voltage, respectively. However, due to the slow decay time, current IPS LCDs are unable to display moving images with high quality.

Therefore, there is a need for an IPS LCD that combines a small amount of polymer network in a liquid crystal to stabilize or otherwise modify the reorientation of the LC director in response to an applied electric field. In addition, there is a need for an IPS LCD that provides a surface-localized polymer in an LC that enables fast switching of LC molecules, so as to improve dynamic response times, allowing the SS-IPS LCD to display moving images with high quality.

SUMMARY OF THE INVENTION

In light of the foregoing, it is a first aspect of the present invention to provide a method of forming a fast-switching IPS (in-plane switching) LCD.

It is another aspect of the present invention to provide a liquid crystal cell comprising a first substrate that is spaced apart from a second substrate; interdigitated electrodes disposed upon the second substrate; a first alignment layer disposed on the first substrate and a second alignment layer disposed upon the second alignment layer and the interdigitated electrodes; liquid crystal material disposed between the first alignment layer and the second alignment layer, wherein each said first and second alignment layers are configured to align the liquid crystals in a first orientation when a voltage is applied to the electrodes; and polymer fibrils disposed in the liquid crystal material and positioned proximate to each said first and second alignment layer, wherein the polymer fibrils align the liquid crystals in a second orientation when no voltage is applied to the electrodes.

It is a further aspect of the present invention to provide a method of forming polymer fibrils in a liquid crystal cell comprising combining a photopolymerizable liquid mixture and a liquid crystal solvent to form a mixture; providing a first substrate and a second substrate that are spaced apart, wherein the first substrate includes a pair of interdigitated electrodes; coating at least one surface of the first and second substrate with an alignment layer; treating the surface of each alignment layer to define a first orientation direction; disposing the mixture between the alignment layers; and irradiating the mixture, such that a plurality of polymer fibrils are formed upon the surface of each alignment layer, the polymer fibrils maintaining the alignment of the liquid crystal molecules of the liquid crystal solvent in the first orientation direction when no voltage is applied to the interdigitated electrodes.

BRIEF DESCRIPTION OF THE DRAWINGS

These and other features and advantages of the present invention will become better understood with regard to the following description, appended claims and accompanying drawings wherein:

DETAILED DESCRIPTION OF THE INVENTION

Figure 1A:
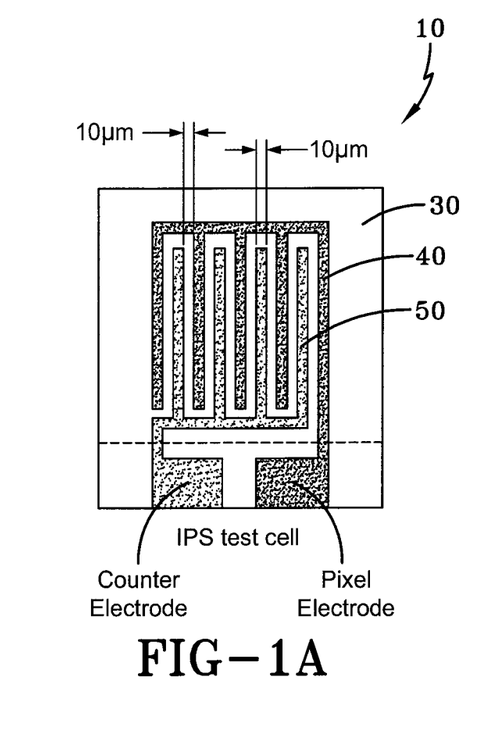
FIG. 1a is a schematic view of a surface stabilized in-plane switching (SS-IPS) LC cell configuration in accordance with the concepts of the present invention.
Figure 1B:
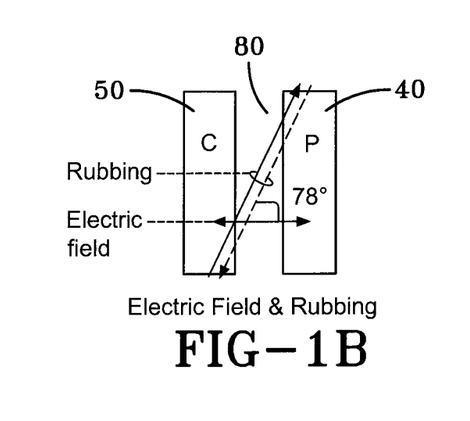
FIG. 1b is a graph showing the rubbing direction of the alignment layer of the SS-IPS cell of FIG. 1a in accordance with the concepts of the present invention.
Figure 1C:
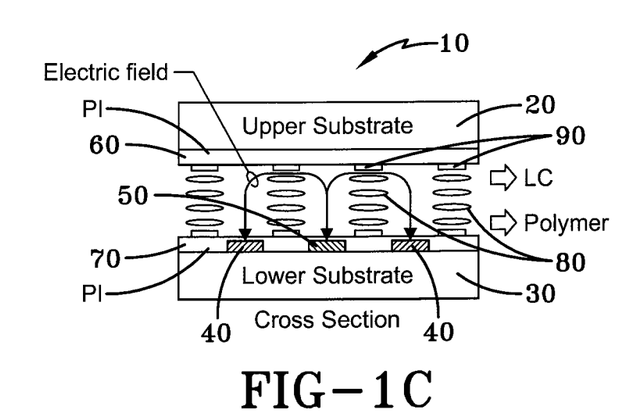
FIG. 1c is a cross-sectional view of the SS-IPS LC cell of FIG. 1a having a surface-localized polymer that is under applied voltage in accordance with the concepts of the present invention.

A fast-switching surface-stabilized in-plane switching (SS-IPS) LCD is generally referred to by numeral 10, as shown in FIGS. 1a-c of the drawings. In particular, the SS-IPS LCD cell 10 comprises a pair of substrates 20 and 30 with interdigitated pixel and count electrodes 40 and 50 that are patterned on one substrate 30 and with no electrode disposed on the other substrate 20. The SS-IPS cell 10 includes treated alignment layers 60 and 70 disposed on the surface of the substrates 20, 30, while electrodes 40,50 serve to establish the liquid crystal (LC) director, which defines the homogeneous alignment for the molecules of a nematic liquid crystal (LC) material 80. The LC material 80 has a positive dielectric anisotropy and includes a concentration of a reactive monomer (RM) and an amount of photoinitiator, which is polymerized by the application of UV (ultra-violet) illumination, regardless of whether an electric field is applied to the LC cell 10. The polymerized LC material results in the formation of polymerized nanofibers or nanofibrils 90 that are disposed on the surface of the alignment layers 60,70 and upon the electrodes 40,50. The polymer nanofibers 90 that are localized on the surface of the electrodes 40,50 of the SS-IPS LCD cell 10 act as an internal surface to the LC cell 10, which modifies and controls the electric field-induced reorientation of the liquid crystal molecules of the LC material 80, such that the LC director favors the zero-field orientation. As such, the average orientation of the liquid crystal molecules are in alignment with the LC director, regardless of whether a voltage is applied to the LC cell 10 via the electrodes 40,50, biasing the alignment of the liquid crystal molecules in the zero-field orientation. Thus, the SS-IPS LCD cell 10 contemplated by the present invention, and the resulting LCD formed from a plurality of SS-IPS cells 10, is able to exhibit high light transmission and enhanced response times (rise and decay times), such as fast rise and decay times, which is highly desirable.

Figure 2A:
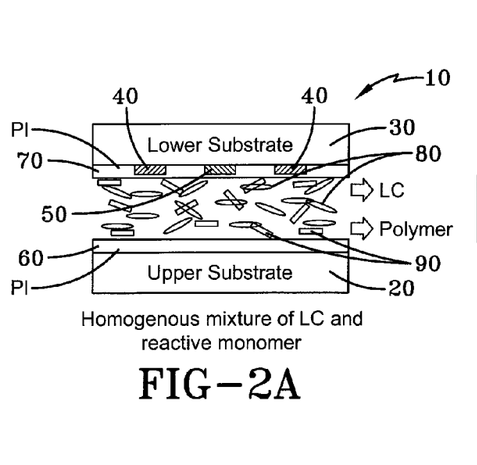
FIGS. 2a-c are cross-sectional views of the SS-IPS LC cell at various stages of its processing in accordance with the concepts of the present invention.

The following discussion presents the process of forming the SS-IPS LCD cell 10 in accordance with the concepts of the present invention. Initially, the photopolymerizable liquid mixture 80 was prepared by dissolving a concentration (0.2%~3.0 wt %) of a reactive monomer RM257 and an amount (0.03-0.15 wt %) of IRGACURE 651 photoinitiator into a liquid crystal solvent, such as ZLI-4792 (Merck, 99.77~94.85 wt %). The resulting liquid crystal material 80 had a dielectric anisotropy of $\Delta\epsilon=5.2$ (at 20° C., and $f=1$ kHz), a birefringence of Dn=0.1 (at 550 nm), an elastic constant of splay $K_1=1.32\times10^{-6}$, a twist of $K_2=6.5\times10^{-7}$, and a bent of $K_3=1.38\times10^{-6}$ dynes, respectively. The LC mixture 80 was sandwiched between the pair of substrates 20,30, while the surface of substrate 30 was patterned with indium-tin-oxide (ITO) electrodes 40,50 disposed thereon. The line and space dimensions of the electrodes 40,50 was about 10 μm and 10 μm, respectively. Next, the substrates 20,30 were each spin-coated with a commercially-available polyimide (PI) solution, to form the Polyimide (PI) alignment layers 60,70 that serve to provide an alignment surface to align the liquid crystal molecules of the LC material 80, as shown in FIG. 2a of the drawings. It should be appreciated that the planar PI alignment layers 60,70 may be formed using any known suitable LCD manufacturing process. Next, the alignment layers 60,70 were pre-baked at about 180° C. for five minutes and then cured at about 250° C. for about one hour. Once cured, the alignment layers 60,70 were then buffed uni-directionally to introduce a small anti-parallel pre-tilt at an angle of twelve degrees with respect to the direction of the electrodes 40,50, as shown in FIG. 1b. This buffing treatment establishes homogeneous boundary conditions for the alignment of the liquid crystal molecules of the LC material 80, as shown in FIG. 2a. The thickness of LC cell 10 was maintained at approximately 3.45-3.5 μm using glass spacers sprayed on the treated glass substrates 20,30, while the LC cell 10 was assembled in an anti-parallel fashion with respect to the rubbing direction.

Figure 2B:
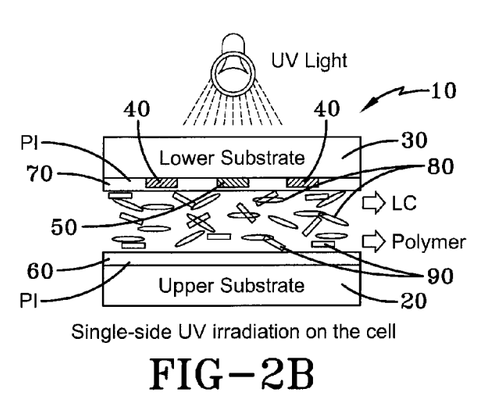
Figure 2C:
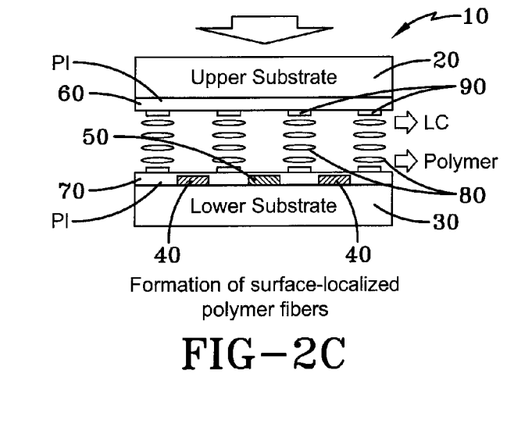
Figure 3A:
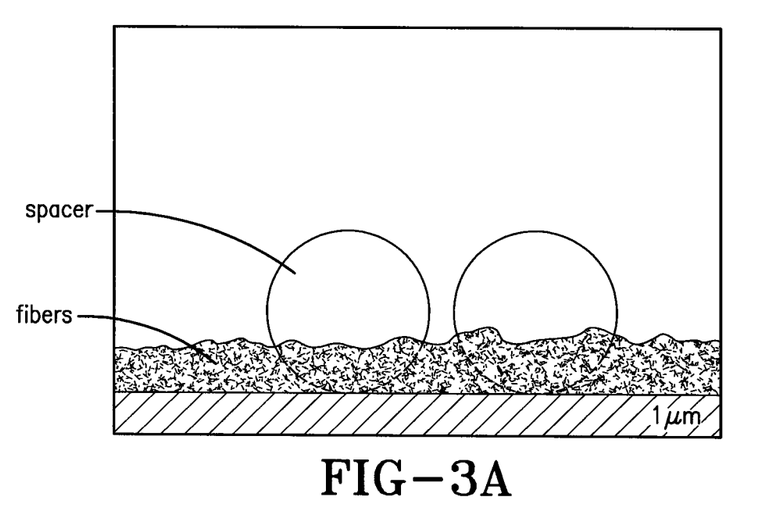
FIG. 3a is a schematic view of a scanning electron microscope (SEM) image of the side view of the SS-IPS LC cell using liquid crystal material having a 3% polymer concentration in accordance with the concepts of the present invention.
Figure 3B:
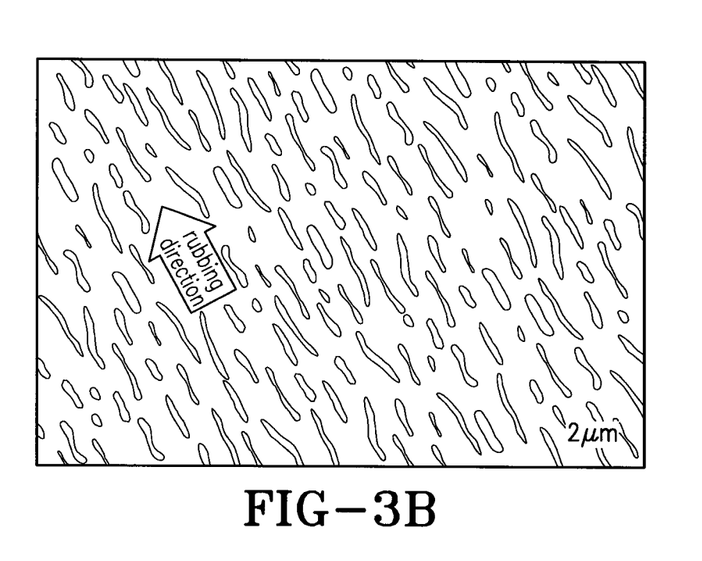
FIG. 3b is a schematic view of a scanning electron microscope (SEM) image of the side view of the SS-IPS LC cell using liquid crystal material having a 3% polymer concentration in accordance with the concepts of the present invention.
Figure 3C:
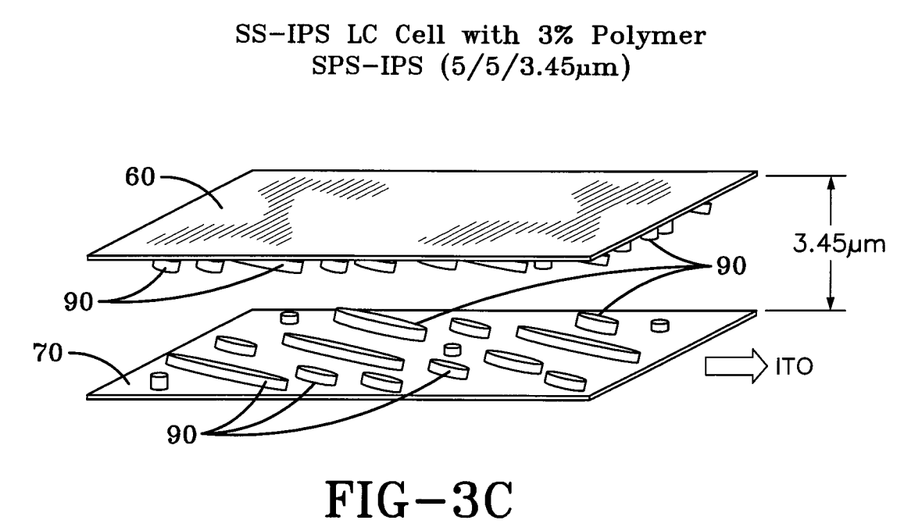
FIG. 3c is a schematic view of the SS-IPS LC cell showing the polymer fibrils disposed in the cell utilizing liquid crystal material having a 3% polymer concentration in accordance with the concepts of the present invention.
Figure 4A:
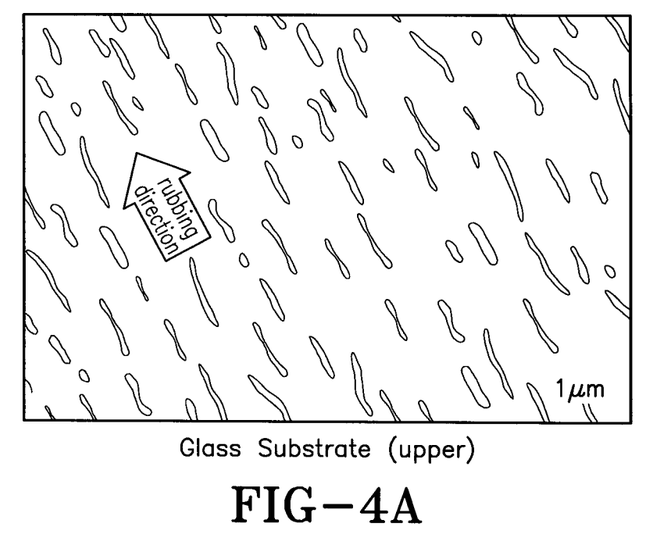
FIG. 4a is a schematic view of a scanning electron microscope (SEM) image of the upper substrate of the SS-IPS LC cell using liquid crystal material having a 0.2% polymer concentration in accordance with the concepts of the present invention.
Figure 4B:
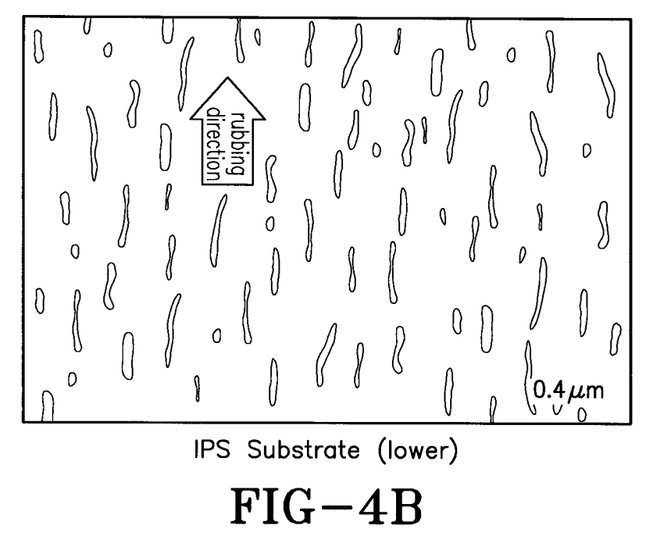
FIG. 4b is a schematic view of a scanning electron microscope (SEM) image of the lower substrate of the SS-IPS LC cell using liquid crystal material having a 0.2% polymer concentration in accordance with the concepts of the present invention.
Figure 4C:
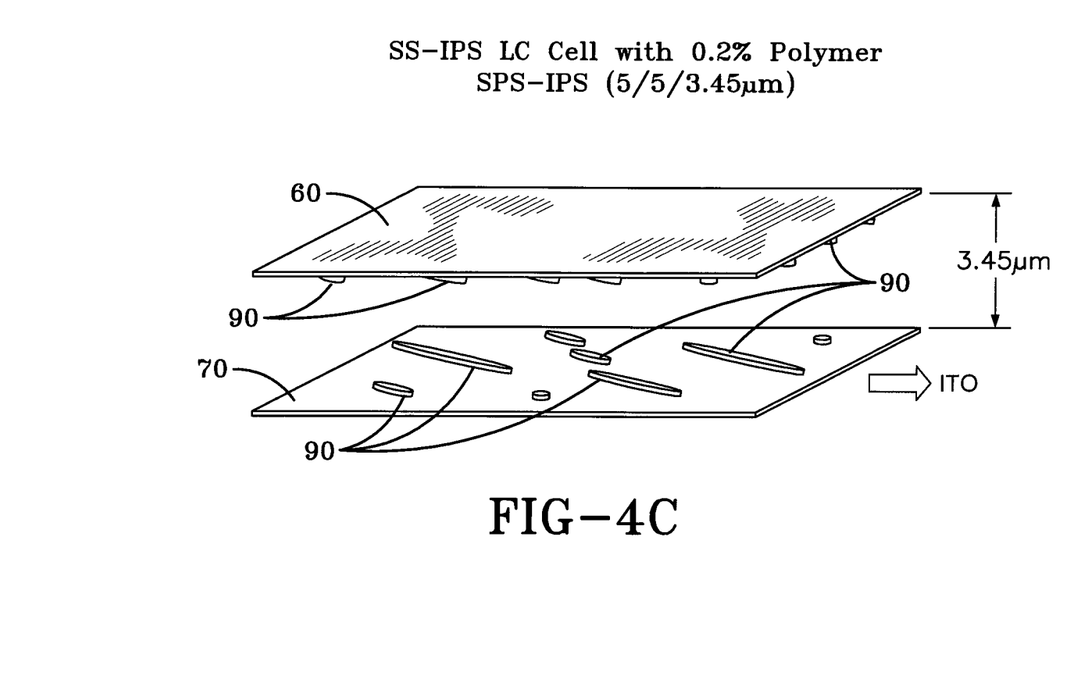
FIG. 4c is a schematic view of the SS-IPS LC cell showing the polymer fibrils disposed in the cell utilizing liquid crystal material having a 0.2% polymer concentration in accordance with the concepts of the present invention.

Finally, the liquid crystal (LC) material 80 that includes the monomer/photoinitiator mixture was then irradiated, as shown in FIG. 2b, such that the substrate 30 carrying the electrodes 40,50 was exposed to UV light for about 30 minutes, at a room temperature of about 21° C., without applying a voltage to the electrodes 40,50 of the LC cell 10. The irradiation of the LC material 80 resulted in the formation of polymer nanofibers/nanofibrils or polymer islands 90 that are disposed onto the surface of the alignment layers 60,70 of the substrates 20, 30, as shown in FIG. 2c. That is, the polymer islands 90 are formed by polymerizing an amount of a reactive monomer that is in the aligned liquid crystal (LC) mixture 80 without an applied voltage being supplied to the electrodes 40,50. For example, the estimated size of the polymer fibrils forming the polymer islands 90 for LC material 80 having a 3% polymer concentration is about 0.1-3 μm in length (L); 100-400 nm in width (W); and a few tens of nanometers, such as 20-30 nm, in height (H), as is shown in FIGS. 3a-c. In particular, FIGS. 3a and 3b show the polymer fibrils or polymer islands 90 as they begin to form in the LC cell 10, while FIG. 3c shows the LC cell 10 and polymer fibrils 90 finally disposed on the alignment layers 60 and 70. In another example, the estimated size of the polymer fibrils or polymer islands 90 for LC material 80 having a 0.2% polymer concentration is about 0.1-3 μm in length (L); 50-100 nm in width (W); and a few tens of nanometers, such as 20-30 nm, in height (H), as is shown in FIGS. 4a-c. Specifically, FIGS. 4a and 4b show the polymer fibrils or polymer islands 90 in a top view of the upper substrate 20 and a top view of the lower substrate 30, respectively, while FIG. 4c shows a schematic view of the SS-IPS LC cell 10 and polymer fibrils disposed on the alignment layers 60,70. As such, the polymer fibrils or islands 90 provide a preferential orientation for the alignment of the liquid crystal molecules of the liquid crystal material 80, which follows or matches the rubbing direction established by the alignment layers 60,70. In addition, the density and distribution of the polymer fibrils or islands 90 depends on the concentration of the polymer in the LC mixture 80, as is clearly shown by FIGS. 3a-c (3% polymer concentration-higher fibril density) and FIGS. 4a-c (0.2% polymer concentration-lower fibril density).

In another aspect, to form a multi-domain LCD structure to enable wide-angle viewing, the SS-IPS LC cell 10 was subjected to an in-plane electric field of approximately 7 VDC, for example, via electrodes 40,50, while the side of the substrate 30 of the LC cell 10 carrying the electrodes 40,50 was irradiated with the UV light for 30 minutes at room temperature (~21° C.).

Figure 5:
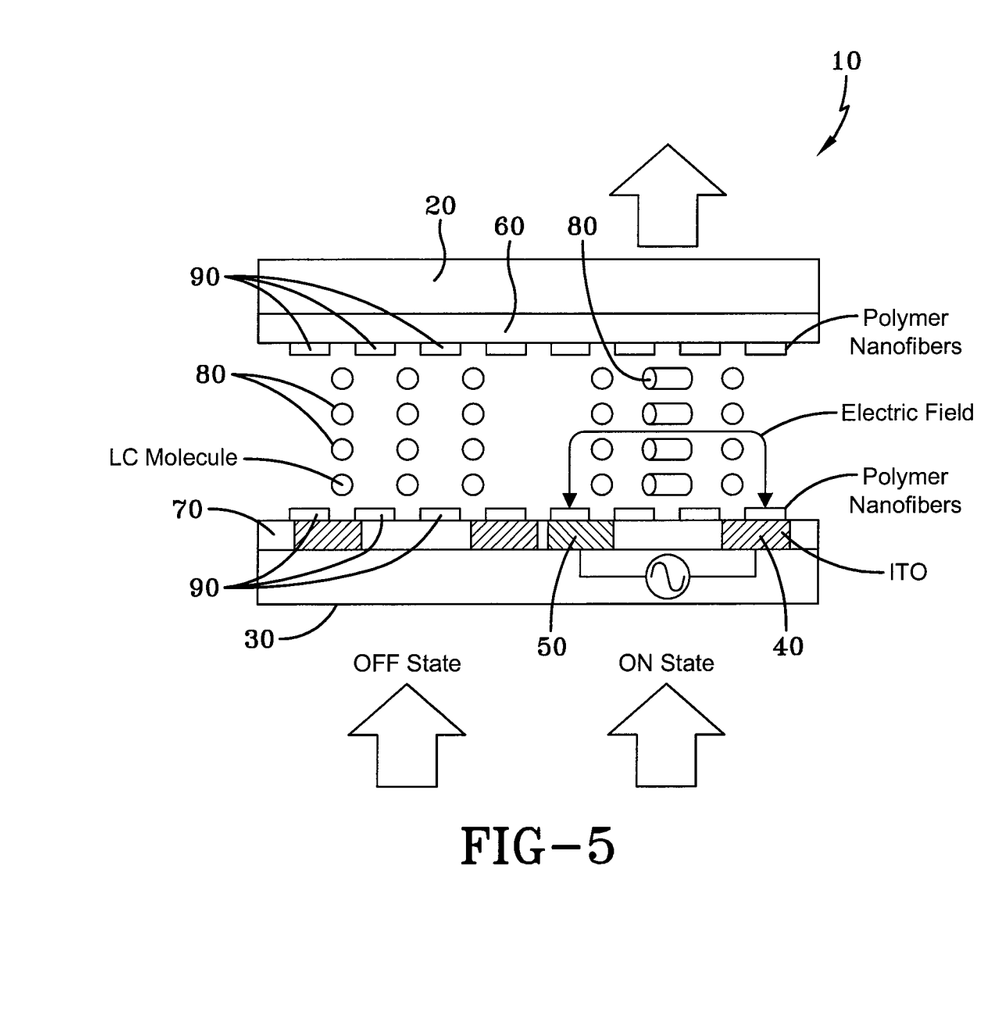
FIG. 5 is a schematic cross-sectional view of the SS-IPS LC cell showing it in an ON state and an OFF state in accordance with the concepts of the present invention.

Thus, while the liquid crystal molecules in the LC material 80 in the resulting SS-IPS LCD cell 10 are aligned by the surface alignment layers 60,70, the polymer fibrils or polymer islands 90 serve to capture the orientation of the liquid crystal molecules of the liquid crystal material, and as such, act as an internal surface, biasing the reorientation of the liquid crystal molecules at zero-field when an electric field is not applied to the LC cell 10 via the interdigitated electrodes 40,50, as shown in FIG. 5.

With the structure of the SS-IPS LCD cell 10 set forth, the following examples present the operating characteristics achieved during its operation.

Example 1

Specifically, the following example presents the testing results of the SS-IPS LCD cell 10 when placed between polarizers that are crossed at 90 degrees with respect to each other, whereby one polarizer is aligned with the average orientation of the nematic LC molecules that is the optical axis in the field-off state. When no electric field is applied, the SS-IPS LCD cell 10 that was placed between the crossed polarizers was viewed as dark. When an AC voltage (square wave) of 1 kHz was applied across the electrodes 40,50, the SS-IPS LCD cell 10 experienced an increase in light transmission and reached a maximum light transmittance at an applied voltage.

Figure 6:
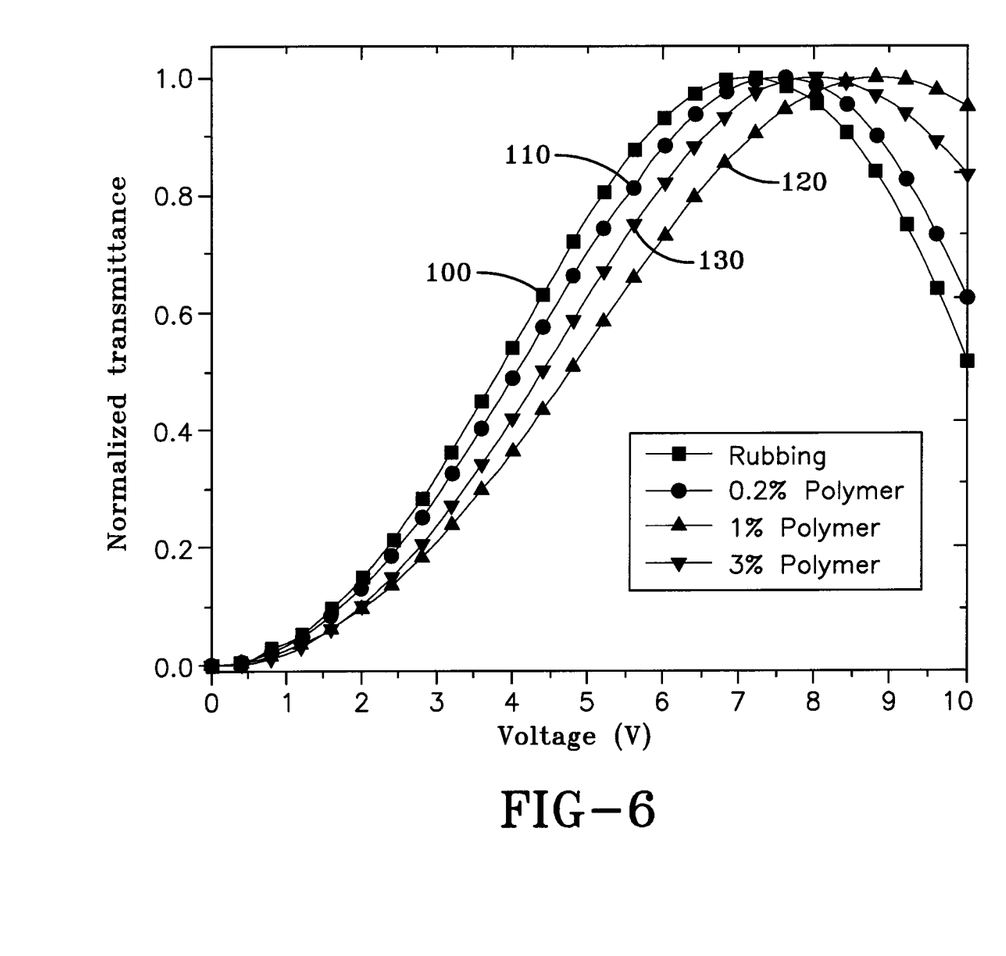
FIG. 6 is a graph showing the transmittance versus applied voltage curves for IPS liquid-crystal cells and for SS-IPS LC cells with 0.0, 0.2, 1.0 and 3.0% of surface polymer in accordance with the concepts of the present invention.

Continuing, FIG. 6 shows a plot or graph of the light transmittance as a function of applied voltage for both a standard IPS LCD cell with an LC mixture with 0% polymer (curve 100) and the SS-IPS LCD cell 10 of the present invention with the LC mixture 80 having a 0.2% (curve 110), 1% (curve 120), and 3% (curve 130) polymer concentration to form islands 90. Next, the threshold voltage ($V_{th}$), which is defined as the voltage that is applied to the LC cell to attain a 10% light transmission, was measured. As such, the $V_{th}$ value for a LC mixture with no polymer (0%) is 1.64 V, while the $V_{th}$ values for the SS-IPS LC cell 10 of the present invention with 0.2%, 1.0%, and 3.0% polymer concentrations are 1.75 V, 2.05 V, and 2.01 V, respectively. The V90 transmission value, which is defined as the voltage that is applied to attain a 90% of the maximum light transmission, was also measured. As such, the V90 transmission value for an IPS LCD cell with no polymer (0%) was 5.8 V, while the V90 values for the SS-IPS LCD cell 10 with 0.2%, 1%, and 3% polymer concentrations were 6.2 V, 7.2 V, and 6.6 V, respectively. Thus, the switching voltages of the SS-IPS LCD cell 10 are low, while the increase in both the threshold and maximum transmission voltages for the SS-IPS LCD cell 10 compared to a standard IPS LCD cell are insignificant. Furthermore, the discrepancy in light transmittances of the SS-IPS LCD cell 10 is negligible, which indicates that the surface-stabilized IPS LC cells 10 of the present invention have high light transmittance.

Figure 7:
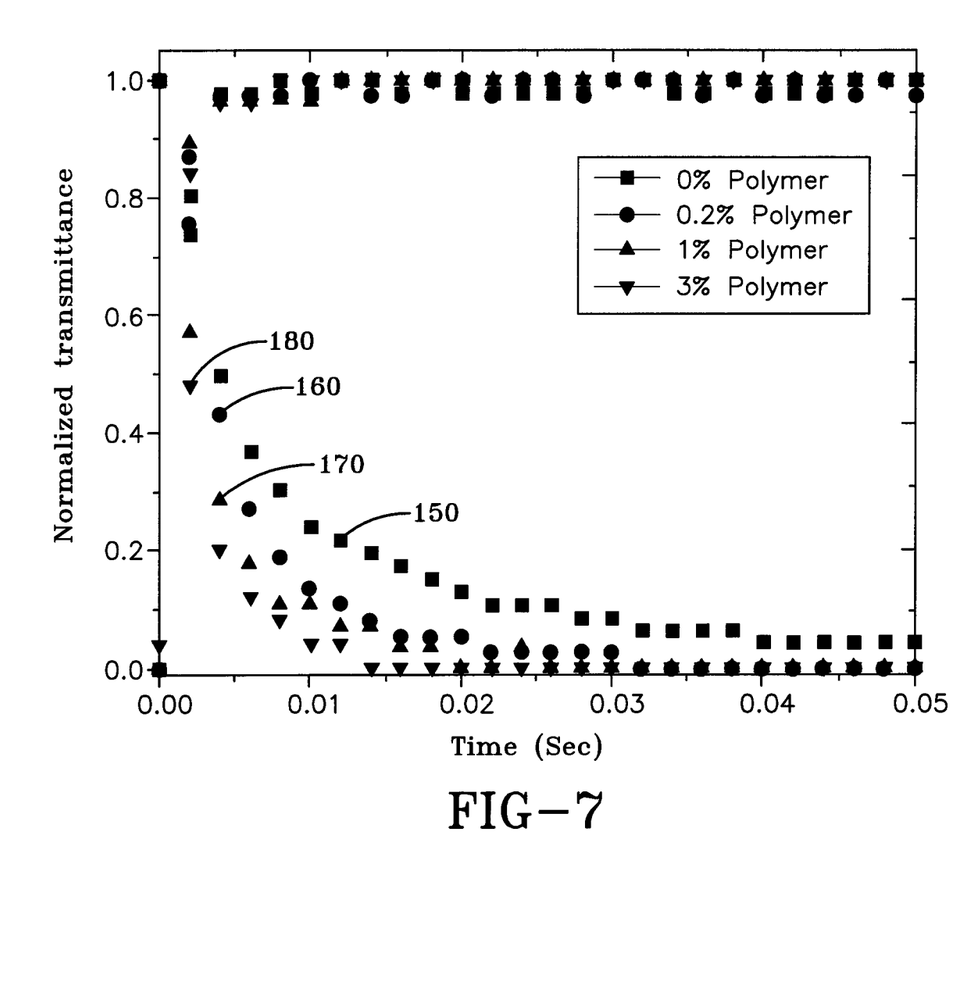
FIG. 7 is a graph showing the rising and falling times for an IPS LC cell and SS-IPS LC cells with 0.0, 0.2, 1.0 and 3.0% of surface polymer in accordance with the concepts of the present invention.

In addition, the dynamic operating characteristics of the SS-IPS LCD cell 10, which include the turn-on (rise) time and the turn-off (decay) time, were analyzed, as shown in FIG. 7. In particular, the turn-on (rise) time of an LC cell is defined as the time required to switch between 10% and 90% light transmission, while the turn-off (decay) time is defined as the time required to switch between 90% and 10% light transmission. Specifically, FIG. 7 shows the rise and decay time curves of a standard IPS cell with 0% polymer (curve 150), and the SS-IPS LCD 10 with 0.2% (curve 160), 1.0% (curve 170), and 3.0% (curve 180) surface polymer concentration used to form islands 90. Thus, the rise and decay times for the standard IPS LC cell without polymer are 2.4 ms and 24 ms, respectively. In addition, the rise and decay times for an SS-IPS LCD cell 10 with 0.2% surface polymer concentration are 2.1 ms and 10.0 ms, respectively; for an SS-IPS LCD cell 10 with 1.0% surface polymer concentration are 2.0 ms and 7.0 ms, respectively; and for an SS-IPS LCD cell 10 with 3.0% surface polymer concentration are 1.3 ms and 6.0 ms, respectively.

Figure 8:
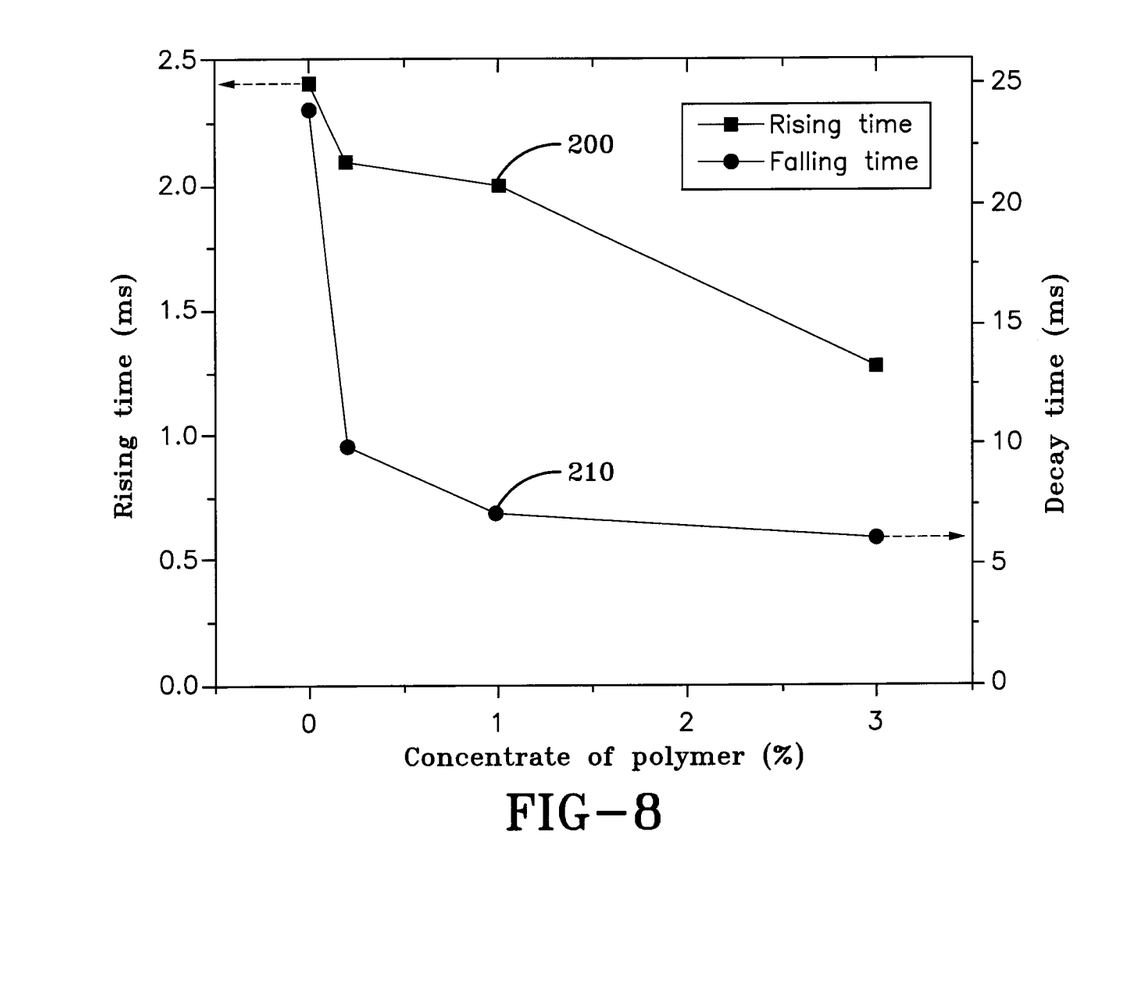
FIG. 8 is a graph that shows the rising and falling times for the IPS and SS-IPS LC cells in accordance with the concepts of the present invention.

The rising and falling (decay) times for an SS-IPS LCD cell 10 having 3.0% surface polymer concentration are shown by curves 200 and 210 respectively in FIG. 8, and were measured at different applied voltages between 10% to 90% and 90% to 10% light transmission, as previously described. FIG. 8 shows the apparent improvement in the dynamic response times in the SS-IPS LCD cells 10 as compared with those of a standard IPS mode LC cell. In comparison with a SS-IPS LC cell 10 having polymer islands 90 formed from 3% polymer, the standard IPS mode LC cell exhibits a rise time that is two times longer and a decay time that is four times longer. Thus, the introduction of a low-density fibril polymer or islands 90 at the electrodes 40,50 and alignment surface 60,70 of the SS-IPS LCD cell 10 enhances the anchoring strength of the liquid crystal molecules of the liquid crystal material 80 and serves to improve the response times of the SS-IPS LC cell 10 of the present invention.

Example 2

In a second example, the SS-IPS LCD cell 10 of the present invention was constructed in the same manner as in example 1, with the exception that a voltage of 7 VDC was applied to the cell 10 during the photopolymerization of the monomer of the LC material 80.

Figure 9A:
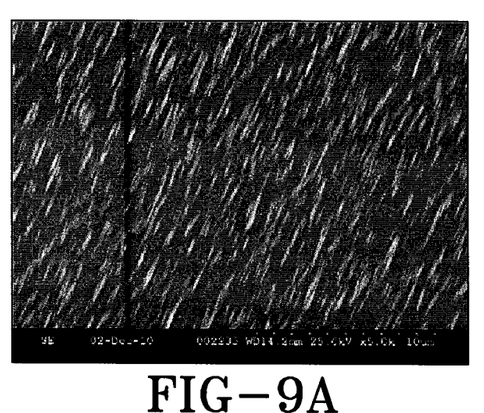
FIG. 9a is a scanning electron microscope (SEM) image showing the low-density surface polymer islands grown on the surface of substrates with electrodes provided by an SS-IPS cell in accordance with the concepts of the present invention.
Figure 9B:
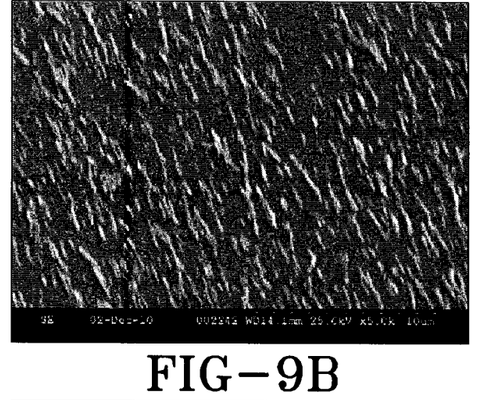
FIG. 9b is a scanning electron microscope (SEM) image of low-density surface polymer islands grown on the opposite surface of the substrates provided by the SS-IPS cell in accordance with the concepts of the present invention.
Figure 9C:
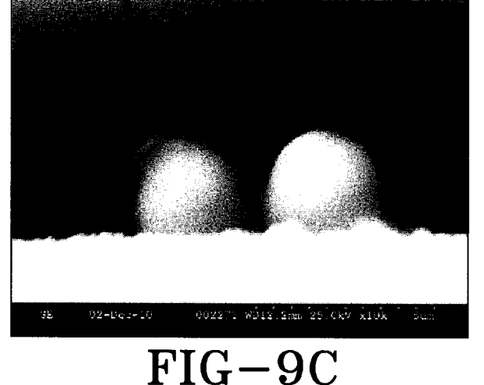
FIG. 9c is a scanning electron microscope (SEM) image of the side view of surface-localized polymer provided by the SS-IPS cell in accordance with the concepts of the present invention.

With a surface-localized polymer or polymer islands 90, the surface-anchoring characteristics of the liquid crystal molecules can be changed, depending on the density of the polymer islands 90. Morphological studies of the SS-IPS LCD cell 10 were carried out using a scanning electron microscope (SEM) in order to show that different electro-optical properties of the SS-IPS LCD cells 10 are caused by the polymer islands 90 or by structures formed at the surfaces of the samples. The results of the SEM analysis are shown in FIGS. 9a-c, whereby the Figs. show the SEM analysis of a 3% polymer SS-IPS LC cell 10 having polymer islands 90 that are grown on both surfaces of the substrates 20,30 with a preferential orientation direction that follows the rubbing direction and the alignment of the LC director of the liquid crystal (LC) molecules. Specifically, FIG. 9a shows the low-density surface polymer islands 90 grown on the surface 60,70 of the substrate 30 with electrodes 40,50, while FIG. 9b shows the low-density surface polymer islands 90 grown on the opposite surface of the substrate 20. Finally, FIG. 9c shows a side view of the low-density polymer islands provided by the SS-IPS LCD cell 10.

Thus, the SS-IPS LCD cell 10 of the present invention provides a fast switching electro-optical device that uses an advanced polymer-stabilization method, whereby the liquid crystal (LC) directors are oriented with a surface-localized polymer formed by the polymer islands 90. To achieve this result, the SS-IPS LC cell 10 utilizes liquid crystal material 80, which includes an amount of a reactive monomer, a photoinitiator, and liquid crystals, which is placed into the liquid crystal cell 10 with appropriate alignment. The cell 10 is then exposed to ultraviolet (UV) light to polymerize the reactive monomer, with or without the applied voltage, which results in the formation of a surface-localized polymer 90 that is disposed upon the alignment layers 60,70 of both substrates 20,30, and that provide a desired liquid crystal alignment.

Therefore, one advantage of the present invention is that a surface-stabilized or SS-IPS LCD utilizes a polymer network that is deposited in liquid crystal material to stabilize or modify the reorientation of the liquid crystal (LC) director in response to an applied electric field. Another advantage of the present invention is that an SS-IPS LCD is capable of providing fast switching of liquid crystal molecules due to increased surface-anchoring strength of the liquid crystal molecules, so as to improve the dynamic response of the SS-IPS LCD. Still another advantage of the present invention is that the SS-IPS LCD provides the same light transmittance with and without an applied electric field to the LC cell.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A liquid crystal cell comprises:
   a first substrate that is spaced apart from a second substrate;
   interdigitated electrodes disposed upon said second substrate;
   a first alignment layer disposed on said first substrate and a second alignment layer disposed upon said second substrate and said interdigitated electrodes;
   liquid crystal material disposed between said first alignment layer and said second alignment layer, wherein each said first and second alignment layers are configured to align said liquid crystals in a first orientation when a voltage is applied to said electrodes; and
   polymer fibrils disposed in said liquid crystal material and positioned proximate to each said first and second alignment layer, wherein said polymer fibrils align said liquid crystals in a second orientation when no voltage is applied to said electrodes;
   wherein said polymer fibrils are formed from a polymer having a concentration of between about 0.2% to 3%.

2. The cell of claim 1, wherein said interdigitated electrodes are at least partially light transparent.

3. The cell of claim 1, wherein said first substrate and said second substrate are at least partially light transparent.

4. The cell of claim 1, wherein said polymer fibrils comprise nanofibers.

5. The cell of claim 1, wherein said concentration is about 0.2%.

6. A method of forming polymer fibrils in a liquid crystal cell comprising:
   combining a photopolymerizable liquid mixture and a liquid crystal solvent to form a mixture, wherein said photopolymerizable liquid mixture comprises a concentration of between about 0.2% to 3%;
   providing a first substrate and a second substrate that are spaced apart, wherein said first substrate includes a pair of interdigitated electrodes;
   coating at least one surface of said first and second substrate with an alignment layer;

treating the surface of each said alignment layers to define a first orientation direction;

disposing said mixture between said alignment layers; and irradiating said mixture, such that a plurality of polymer fibrils are formed upon the surface of each said alignment layer, said polymer fibrils maintaining the alignment of the liquid crystal molecules of the liquid crystal solvent in said first orientation direction when no voltage is applied to said interdigitated electrodes.

7. The method of claim 6, wherein said photopolymerizable liquid mixture comprises a reactive monomer and a photoinitiator.

8. The method of claim 6, wherein said polymer fibrils comprise nanofibers.

9. The cell of claim 6, wherein said interdigitated electrodes are at least partially light transparent.

10. The cell of claim 6, wherein said first substrate and said second substrate are at least partially light transparent.

11. The method of claim 6, wherein said concentration is about 0.2%.

* * * * *